Figures 1, 2:
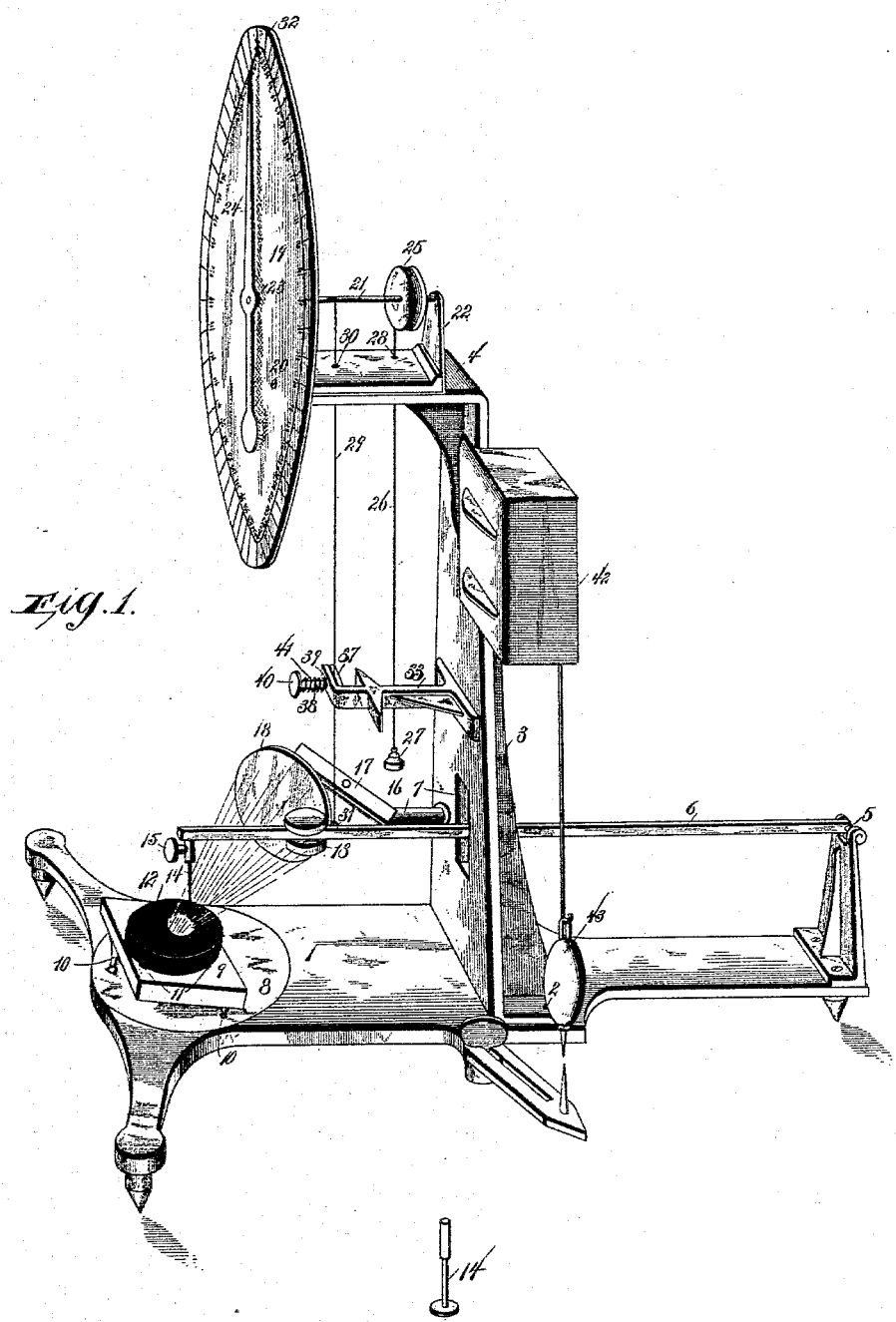

(No Model.)

H. C. BOWEN.
APPARATUS FOR DETERMINING VISCOSITY.

No. 494,974. Patented Apr. 4, 1893.

Witnesses
Louis G. Julihn
Eric G. Julihn

Inventor
H. C. Bowen.
By Hopkins & Atkins
Attorneys

UNITED STATES PATENT OFFICE.

HENRY C. BOWEN, OF NEW YORK, N. Y.

APPARATUS FOR DETERMINING VISCOSITY.

SPECIFICATION forming part of Letters Patent No. 494,974, dated April 4, 1893.

Application filed December 9, 1892. Serial No. 454,587. (No model.)

*To all whom it may concern:*

Be it known that I, HENRY C. BOWEN, of New York, county of New York, and State of New York, have invented a certain new and useful Machine for Measuring the Relative Cohesions of Liquid and Semi-Liquid Bodies, of which the following is a specification, reference being had to the accompanying drawings.
The object of my invention is to produce an instrument of precision for determining the relative viscosity or softness of liquids, or semi-liquids.

My machine is constructed upon the principle that bodies of different cohesion will oppose different resistances to penetration. In determining the relative viscosity of semi-liquid bodies I employ a sharp-pointed instrument, as for example a needle, cone, or wedge; and in determining the viscosity of liquids I employ a spindle with a disk attached to the lower end, for example. The relative viscosity is determined by the relative distance the instrument, impelled by any fixed weight, will penetrate the body in any given interval of time.

In the accompanying drawings, Figure 1 is a perspective view of my apparatus, showing a needle in position for determining the viscosity of a semi-liquid body. Fig. 2 illustrates the penetrating instrument that I design to use in measuring the viscosity of liquids.

Referring to the figures on the drawings, 1 indicates a tripod pedestal, to which, as by screws 2, is secured a standard 3 provided with a horizontal bridge 4 at its upper extremity. The pedestal and standard constitute the frame of my apparatus. The pedestal is preferably of irregular oblong shape, as illustrated, and carries upon its rear end a fulcrum 5, to which is pivotally secured one end of a lever-arm 6 that extends through a vertical opening 7 in the standard, and within which it may move with perfect freedom. The lever arm 6 shows what I now consider a preferable form of penetrator carrier.

8 indicates a smooth even base, upon which is designed to rest a movable block 9, that, for the purposes of adjustment, is provided with three feet 10 one of which is of different length from the other two, so that the surface of the block stands upon an incline. Any suitable means of adjustment may be substituted for the inclination of the block.

11 indicates three points or projections designed to firmly support the body to be tested, a mass of which, ready for testing, is indicated at 12 in Fig. 1 of the drawings.

13 indicates a weight adjustable upon the lever-arm.

14 indicates a penetrator, and 15 a fastening device, which may be of any suitable construction for securing the penetrator to the free end of the lever.

16 indicates a stud secured to the face of the standard, and carrying by means of an arm 17, for example, a universally adjustable mirror 18.

19 represents an indicating dial secured, as by screws 20, to the end of the bridge.

21 indicates an axle mounted in suitable bearings in the center of the dial, and in an upright support 22, suitably secured to the top of the bridge, and of a sufficient height to render the axle horizontal. The forward end of the axle projects through an opening 23 in the dial and carries upon its end a fixed pointer 24.

25 indicates a pulley, around which in one direction is wound a pull cord 26. One end of the pull-cord is fastened to the pulley, and the other end is provided with a counterbalancing knob 27, for example.

28 indicates an opening in the bridge, through which the pull-cord may be passed.

29 indicates a lever-cord or thread, to which is fastened at one end the axle 21, and being wound around the axle in a direction opposite to that in which the pull-cord is wound around the pulley, it is passed in a direct vertical line, as through an opening 30 to the lever 6 to which it is fastened in any suitable manner, as indicated at 31.

By the construction and arrangement just described, the lever acting by gravity tends to descend, and through the lever-cord to impart rotary motion to the axle, the degree of rotation being indicated by graduations 32 upon the dial face. By pulling upon the pull-cord the operator may readily raise the lever as desired.

33 indicates a fixed clamp-support projecting from the face of the standard. This support carries a suitable clamp upon its extremity, which, for the sake of simplicity, preferably consists of a horizontal projection from the end of the clamp-support, and a movable clamp-plate 37 that abuts at one end against the clamp-support, and is guided evenly thereby in its movement to and from the fixed part of the clamp.

38 indicates a pin fastened at one end to the movable clamp-plate, and which, passing through an opening 39 in the fixed clamp-plate, terminates in a head or button 40. A spring 41, intermediate between the button and the outside of the fixed clamp-plate serves to hold the movable clamp-plate normally pressed against the fixed clamp-plate. The clamp is arranged so that the lever-cord passes between the plates which compose it, and is normally held by the clamp, but may be released at will by pressure upon the button.

The clamp illustrated, and the means for actuating it are intended to be simply illustrative of my invention, and any suitable mechanism, adapted to control the movement of the penetrator-carrier, and applicable in any suitable manner, may be substituted therefor.

42 indicates a clock, the pendulum 43 whereof may be made to beat at any time desired. The clock is designed to measure the interval of time that measures the duration of penetration, and from which the readings of the machine are taken.

The operation of my apparatus is as follows: A sample of coal-tar, for example, that has been melted into a suitable box and brought to the required temperature, is placed upon the block 9 directly under the penetrator, and the mirror 18 is adjusted until a pencil of rays is directed upon the surface of the tar. Thereupon the operator holding the clamp open, by pressing upon the button 40 with one hand, moves the penetrator-carrier with the other until the point of the needle or penetrator, clearly distinguishable by the strong light thrown upon the tar, nearly touches the surface of the tar. The button is then released, and the clamp closes upon the lever-thread, thereby sustaining the weight of the penetrator-carrier. The block with the tar is next pushed along in the direction of the incline of the block until the inclined surface of the tar shall have come into exact contact with the needle. The point of exact contact may be readily determined by the aid of the reflection of the needle from the bright mirror like surface of the tar. When contact has been effected in the manner described, the reading of the pointer on the dial is taken, which we will suppose to be 70. The clamp is then held open for the length of time it is desired to continue the penetration. The releasing of the thread by the clamp allows the weighted lever-arm to force the penetrator into the tar. At the end of the desired interval of time the clamp is allowed to close, and the further descent of the needle is prevented. The reading of the pointer on the dial is again noted, which say is 160. By subtracting the former reading from the latter the remainder, 90, indicates the amount of penetration by that arbitrary number. If the viscosity of a liquid is to be obtained the operation is precisely similar with the difference that the disk penetrator is used instead of the needle. By the term penetrator in this connection, I mean any more or less pointed instrument which may be driven through a substance as distinguished from a buoyant body. The number indicated upon the dial being arbitrary, its value depends upon its comparison with the reading obtained from a test of an adopted standard, as for example air or water.

It should be understood that in making comparative tests conditions of temperature, and duration of intervals of time must be taken into consideration; and that in fixing those conditions regard should also be had to the nature of the substance to be tested, and the uses to which it is to be applied.

When several machines are required to give the same degree of penetration with the same substance—that is to say, give concordant readings they are made to correspond by adjusting the weight 13 upon the lever arm 6, for example; or they may be graduated by any other suitable and convenient means.

My apparatus can be used in rating all sorts of lubricating oils, or paraffine in their various applications, cements used in asphalt paving, coal-tars, and asphalt for dipping tanks, tars for paving joints, roofing and painting purposes, clays and clay mixture for all pottery and earthen ware, prepared paints, bakery doughs, the setting of hydraulic cements, asphalt paving mixtures, &c.

While I have illustrated and described a particular form of apparatus, I desire it to be distinctly understood that I do not limit myself to the exact details of construction; but desire to reserve fully the right to modify the same within the scope of my invention.

I am aware that machines have been used for testing the specific gravity of liquids, consisting of a float and an indicator. I do not claim such an apparatus, but employ, instead of a float, a penetrator clearly defined by the terms of the specification.

What I claim is—

1. In a machine for determining the relative viscosity of bodies, the combination with a frame, of a movable penetrator-carrier and penetrator, substantially as set forth.

2. In a machine for measuring the relative viscosity of bodies, the combination with a frame, of a movable penetator-carrier and penetrator, and an indicator operatively connected with the penetrator-carrier for indicating its movement, substantially as set forth.

3. In a machine for measuring the viscosity of bodies, the combination with a ponderable movable arm, of a penetrator-carrier thereon, whereby gravity is allowed to act unimpededly in forcing entrance into or passage through substances being tested, substantially as set forth.

4. In an apparatus for measuring the viscosity of bodies, the combination with a ponderable lever arm and penetrator, of an axle operatively connected with the lever arm, a pointer upon the axle and a graduated dial against which the pointer registers, substantially as set forth.

5. In an apparatus for measuring the viscosity of bodies, the combination of a suspended vertically-movable penetrator-carrier and penetrator, of mechanism for permitting or interrupting vertical movement of the penetrator-carrier, substantially as and for the purpose specified.

6. In an apparatus for determining the relative viscosity of bodies, the combination with a frame, ponderable lever-arm and penetrator carried thereon, of a lever-thread and axle and pulley, and a clamp for controlling the movement of the lever-thread, substantially as set forth.

7. In a machine for measuring the relative viscosity of bodies, the combination with a frame, a movable penetrator-carrier and penetrator, of an adjustable table for readily securing contact of the penetrator with the surface to be tested, substantially as and for the purpose specified.

8. In an apparatus for determining the viscosity of bodies, the combination with a frame, movable penetrator-carrier and penetrator, of an inclined block adapted to be moved upon the surface of the frame for the purpose of making contact between the penetrator and the substance to be tested, substantially as set forth.

9. In an apparatus for measuring the viscosity of bodies, the combination with a frame, a movable penetrator-carrier and penetrator, of a time piece for measuring a required interval of time in the operation of the apparatus, substantially as and for the purpose specified.

In testimony of all which I have hereunto subscribed my name.

HENRY C. BOWEN.

Witnesses:
　ELWYN WALLER,
　CHAS. A. SNIFFIN.